United States Patent
Nagasaka et al.

(10) Patent No.: US 8,749,180 B2
(45) Date of Patent: Jun. 10, 2014

(54) METHOD FOR CONTROLLING AN ELECTRIC CYLINDER AND A CONTROL SYSTEM FOR THE ELECTRIC CYLINDER

(75) Inventors: Masahiko Nagasaka, Shinshiro (JP); Yoichiro Shirai, Shinshiro (JP)

(73) Assignee: Sintokogio, Ltd., Nagoya (JP)

( * ) Notice: Subject to any disclaimer, the term of this patent is extended or adjusted under 35 U.S.C. 154(b) by 0 days.

(21) Appl. No.: 13/575,450

(22) PCT Filed: Apr. 7, 2011

(86) PCT No.: PCT/JP2011/058785
§ 371 (c)(1),
(2), (4) Date: Jul. 26, 2012

(87) PCT Pub. No.: WO2011/162007
PCT Pub. Date: Dec. 29, 2011

(65) Prior Publication Data
US 2013/0088182 A1    Apr. 11, 2013

(30) Foreign Application Priority Data
Jun. 25, 2010    (JP) ................................. 2010-144831

(51) Int. Cl.
*H02P 1/00*    (2006.01)
*H02P 3/00*    (2006.01)

(52) U.S. Cl.
USPC ...... 318/135; 318/468; 318/490; 318/400.08; 318/566

(58) Field of Classification Search
USPC ............ 318/566, 135, 468, 490, 625, 400.08; 100/35, 45
See application file for complete search history.

(56) References Cited

U.S. PATENT DOCUMENTS 4,953,109 A * 8/1990 Burgis ........................ 700/275
5,251,146 A * 10/1993 Neko et al. .................. 700/203
(Continued)

FOREIGN PATENT DOCUMENTS

JP    06-245561    9/1994
JP    08-103898    4/1996
(Continued)

OTHER PUBLICATIONS

International Search Report dated Jul. 12, 2011 issued in International Application No. PCT/JP2011/058785, 1 page.

*Primary Examiner* — Paul Ip
(74) *Attorney, Agent, or Firm* — Finnegan, Henderson, Farabow, Garrett & Dunner, L.L.P.

(57) ABSTRACT

The present invention is aimed to realize a method and a system for controlling an electric cylinder by which the load detector that is attached to an electric cylinder and the rod of the cylinder can avoid being overloaded. An unexpected bump between the rod of the cylinder and the material to be pressed can cause that overload.

A servo controller 17 determines whether the load for pressurizing Pm detected by the load detector 13 is larger than or equal to the load for detecting a bump Pc. If it is determined that the load for pressurizing Pm is larger than or equal to the load for detecting a bump Pc, the servo controller 17 determines whether the flag for stopping is ON. Also, the controller 17 determines whether the speed Sm of the rod 11 is greater than or equal to an allowable speed to bump Sc. If it is determined that the flag for stopping is ON or if it is determined that the speed Sm of the rod 11 is greater than or equal to an allowable speed to bump Sc, then the rod 11 is crash stopped by providing to a servo amplifier 16 a command pulse signal for positioning in the reverse direction and by decreasing the number of stored pulses in the amplifier 16.

18 Claims, 14 Drawing Sheets

(56) References Cited

U.S. PATENT DOCUMENTS

| | | | |
|---|---|---|---|
| 6,057,661 A | 5/2000 | Iwashita | |
| 6,318,508 B1* | 11/2001 | Inoue | 187/394 |
| 6,880,331 B1* | 4/2005 | Hulse et al. | 60/368 |
| 7,100,870 B2* | 9/2006 | Flatt | 244/99.2 |
| 7,176,648 B2* | 2/2007 | Choi | 318/625 |
| 7,239,097 B2* | 7/2007 | Hashimoto | 318/400.08 |
| 7,261,540 B2* | 8/2007 | Uchiyama et al. | 425/145 |
| 7,481,160 B1* | 1/2009 | Simon et al. | 100/50 |
| 7,926,419 B1* | 4/2011 | Simon et al. | 100/35 |
| 8,336,817 B2* | 12/2012 | Flatt | 244/99.9 |
| 8,336,818 B2* | 12/2012 | Flatt | 244/99.9 |
| 2002/0056377 A1* | 5/2002 | Gawley et al. | 100/35 |
| 2002/0108507 A1* | 8/2002 | May et al. | 100/45 |
| 2005/0005785 A1* | 1/2005 | Poss et al. | 100/240 |
| 2005/0103928 A1* | 5/2005 | Flatt | 244/10 |
| 2005/0144936 A1* | 7/2005 | Hulse et al. | 60/368 |
| 2005/0258795 A1* | 11/2005 | Choi | 318/625 |
| 2005/0281905 A1* | 12/2005 | Uchiyama et al. | 425/149 |
| 2006/0191347 A1* | 8/2006 | Uchiyama et al. | 73/714 |
| 2007/0114956 A1* | 5/2007 | Hashimoto | 318/139 |
| 2008/0203221 A1* | 8/2008 | Flatt | 244/99.2 |
| 2008/0303471 A1* | 12/2008 | Fujishiro | 318/563 |
| 2009/0108129 A1* | 4/2009 | Flatt | 244/99.9 |
| 2009/0108130 A1* | 4/2009 | Flatt | 244/99.9 |
| 2009/0218710 A1* | 9/2009 | Hakoda et al. | 264/40.5 |
| 2011/0061546 A1* | 3/2011 | Correale et al. | 100/4 |
| 2012/0240796 A1* | 9/2012 | Zimmerman et al. | 100/35 |
| 2013/0141030 A1* | 6/2013 | Duits et al. | 318/468 |

FOREIGN PATENT DOCUMENTS

| | | |
|---|---|---|
| JP | 11-058099 | 3/1999 |
| JP | 2004-364396 | 12/2004 |
| JP | 2005-138110 | 6/2005 |
| JP | 2009-101419 | 5/2009 |

\* cited by examiner

METHOD FOR CONTROLLING AN ELECTRIC CYLINDER AND A CONTROL SYSTEM FOR THE ELECTRIC CYLINDER

FIELD OF THE INVENTION

The present invention relates to a method for controlling an electric cylinder driven by a servomotor and a control system for the electric cylinder.

BACKGROUND OF THE INVENTION

A device for pressurizing a material to be pressed at a target load is well known, wherein the device has a mechanism that uses a servomotor and a load detector. The mechanism feeds the load detected by the detector back to the servomotor, and controls the material to be pressed at a target load (e.g., Patent Documents 1 and 2).

However, by the device for pressurizing disclosed in Patent Documents 1 and 2, because of any improper inputting of a program or a mistake in operating the device, when a rod of an electric cylinder is driven the rod may unexpectedly bump a material to be pressed. The unexpected bump causes an overload, and thus the electric cylinder or a load detector attached to the rod can be broken by being overloaded.

Therefore, for a toggle-type punch press device that has a servomotor as a driving source, a malfunction detector, etc., for the device, is proposed. The detector detects an unexpected abnormal load of the device by the torque of the servomotor and outputs an alarm signal when an unexpected bump occurs so as to avoid the possible overload caused by the bump (e.g., Patent Document 3).

Also, a method is proposed for a servo press device that is operated in a speed-control mode in which an analog voltage is used as an output signal from a means for a command process for a servomotor (servo controller) to a means for providing the command for the servomotor (servo amplifier). The method detects an unexpected abnormal load, outputs an alarm signal for avoiding an overload caused by an unexpected bump, and then a press means is driven in the reverse direction to that for pressurizing (e.g., Patent Document 4).

Patent Document 1: Japanese Patent Publication Laid-open No. 2005-138110
Patent Document 2: Japanese Patent Publication Laid-open No. 2009-101419
Patent Document 3: Japanese Patent Publication Laid-open No. H08-103898
Patent Document 4: Japanese Patent Publication Laid-open No. H11-58099

DISCLOSURE OF THE INVENTION

The technology disclosed in Patent Document 3 employs a position-control mode in which a pulse signal is used as an output signal from a controller (servo controller) to a servo amplifier. In the position-control mode, an electric cylinder can be driven at an appropriate speed and be stopped at an accurate position. Thus, it is widely employed as a control mode for an electric cylinder. However, if the position-control mode is used, the number of stored pulses that are generated in a servo amplifier that drives the servomotor may cause the cylinder to be overloaded.

The number of stored pulses is calculated by the difference between the number of fed pulses and the number of pulses that are fed back to a servo amplifier. In a drive-system of a servomechanism, a mechanical system, such as a device for pressurizing, has inertia. Accordingly, if the command pulse signal for positioning sent by a servo controller is provided to a servomotor without any change, the drive-system will be delayed and will not be able to follow the signal. Therefore, a method is used in which the pulses for a command for positioning are stored in the deviation counter in the servo amplifier, and the rotation of the servomotor is controlled in response to the number of stored pulses.

In this system, if it is intended to stop the servomotor, and even if the pulses for a command for positioning from the servo controller were to be stopped, the servomotor would continue to rotate corresponding to the number of stored pulses until the pulses in the deviation counter reach 0 (zero). Accordingly, the rod would move and the system would be overloaded.

Therefore, unless the problem caused by the stored pulses is resolved, the method for controlling disclosed in Patent Document 3 will not be satisfactorily performed when the device for pressurizing is controlled in the position-control mode. Namely, there will appear a problem in that an electric cylinder or a load detector attached to a rod cannot avoid being broken.

The technology that is disclosed in Patent Documents 3 and 4 detects an abnormality when the value for pressurizing goes over a preliminary memorized allowance for pressurizing and when a ram (slide) is at a predetermined position. Therefore, when pressurizing is repeated, this method for controlling is appropriate for a device for pressurizing applied to a work having a uniform thickness such as sheet metal. However, there is a problem in that this method is difficult to use for a device for pressurizing applied to a work of which the height or location varies each time relative to the axis of pressurizing, such as a press-fitting, a compression molding of a fine particle, a device for a conveyance, etc.

Also, by the technology that is disclosed in Patent Documents 3 and 4, an operator should set and store an allowable value for a load for pressurizing at any location where the ram (slide) is relative to the device, whenever the work is replaced. Thus, it has a problem in that the process for the operation has no general-purpose properties, and is complicated. Accordingly, it has low productivity.

The invention of this application is a method for controlling an electric cylinder driven by a servomotor and a control system for the cylinder. It aims to prevent the electric cylinder and a load detector attached to a rod from being damaged by an overload. Such an overload is caused by an unexpected bump between the rod of the electric cylinder and a material to be pressed. The bump is caused by an error in operation or in inputting a program when the rod of the electric cylinder is operated. Also, it aims to realize a method for controlling an electric cylinder and a control system for an electric cylinder that can be used for pressurizing a material of which the height varies relative to the axis of pressurizing and that differs from that of another material.

The invention was made to accomplish these aims. The first aspect of this invention relates to a method for controlling an electric cylinder in a device. The device comprises an electric cylinder that moves a rod, a load detector attached to the rod that detects the load for pressurizing applied to a material to be pressed, a servomotor that drives the electric cylinder, and a position detector attached to the servomotor that is electrically connected to a servo amplifier. The servo amplifier is electrically connected to the servomotor and to a servo controller and controls the movement of the servomotor. The servo controller is electrically connected to the load detector and the servo amplifier and outputs a control command to the servo amplifier so as to control the servomotor.

The method comprises a step for controlling the movement of the rod, a step for detecting a bump, a step for detecting a flag for stopping when a bump occurs, a step for detecting an allowable speed to bump, and a step for crash stopping.

In the step for controlling the movement of the rod, in the servo controller a speed of the rod, a load for detecting a bump between the rod and the material to be pressed, a flag for stopping when a bump occurs, and an allowable speed to bump, are set. The flag for stopping is set for determining whether the driving of the rod should be allowed if the bump between the rod and the material is detected. The allowable speed to bump is set for determining whether the speed of the rod is the value at which the rod should be crash stopped. In this step, the servo controller drives the rod based on the speed of driving that has been input into the controller. Also, it causes the load detector to provide to the servo controller a signal for the load for pressurizing corresponding to the load for pressurizing detected by the load detector.

In the step for detecting a bump, the servo controller determines whether the load for pressurizing is larger than or equal to the load for detecting a bump between the rod and the material, based on the signal for the load for pressurizing.

In the step for detecting a flag for stopping, the servo controller determines whether the flag is ON.

In the step for detecting an allowable speed to bump, if the flag is OFF at the step for detecting the flag, the servo controller determines whether the speed of the rod is greater than or equal to an allowable speed to bump.

In the step for crash stopping, if it is determined that the load for pressurizing is larger than or equal to the load for detecting the bump at the step for detecting a bump and it is determined that the flag is ON at the step for detecting a flag for stopping, the rod is crash stopped by braking the rod or driving the rod in the reverse direction. Also, if it is determined that the speed of the rod is greater than or equal to the allowable speed to bump at the step for detecting an allowable speed to bump, the rod is crash stopped in the same way.

By the first aspect of this invention, in the step for controlling the movement of the rod, the servo controller can drive the rod based on the speed of driving that has been input into the controller. Also, it can provide, from the load detector to the servo controller, a signal for the load for the pressurizing corresponding to the load for pressurizing detected by the load detector. In the step for detecting a bump, the servo controller can determine whether the load for pressurizing is larger than or equal to the load for detecting a bump between the rod and the material to be pressed, based on the signal for the load for pressurizing. In the step for detecting a flag for stopping, the servo controller can determine whether the flag is ON. In the step for detecting an allowable speed to bump, if the flag is OFF at the step for detecting the flag, the servo controller can determine whether the speed of the rod is greater than or equal to an allowable speed to bump. In the step for crash stopping, if it is determined that the load for pressurizing is larger than or equal to the load for detecting the bump at the step for detecting a bump and it is determined that the flag is ON at the step for detecting a flag for stopping, the rod can be crash stopped by braking the rod or driving the rod in the reverse direction. Also, if it is determined that the speed of the rod is greater than or equal to the allowable speed to bump at the step for detecting an allowable speed to bump, the rod can be crash stopped in the same way.

Accordingly, after the bump between the rod and the material to be pressed is detected, if the speed of the rod when it bumps is greater than or equal to the allowable speed to bump, the rod can be crash stopped by braking the rod or driving the rod in the reverse direction. Therefore, the electric cylinder and the load detector attached to the rod can avoid being broken by being overloaded.

In a process in which a bump between the rod and the material to be pressed is not assumed, e.g., a process for moving the rod or a process for a jog, if a load to be sent to the rod is larger than or equal to the load for detecting the bump, the process is obviously determined to be in an abnormal state. In such a process, by setting the flag for stopping to ON, if the load is determined to be larger than or equal to the load for detecting the bump, the rod will be crash stopped and avoid being overloaded.

This invention does not use a method in which an abnormality is determined when a load goes over a predetermined allowable load for pressurizing at a predetermined location of a rod, wherein the allowable load has been preliminarily set and memorized for that location. Therefore, this invention can be applied to a press work for a material to be pressed in which the height of an axis for pressurizing differs from that for another material.

The second aspect of this invention relates to a method for controlling the electric cylinder of the first aspect of this invention. Namely, it is characterized in that, when the movement of the servomotor is controlled in a position-control mode, the step for crash stopping comprises a step for computing the number of stored pulses and a step for outputting a command pulse signal for positioning in the reverse direction. At the step for computing the number of stored pulses, the servo controller computes the number of stored pulses by subtracting the number of pulses of a feedback pulse signal from the number of pulses of the command pulse signal for positioning. The command pulse signal for positioning is the signal when the determination is done at the step for detecting a flag for stopping or at the step for detecting an allowable speed to bump. The feedback pulse signal is provided by the servo amplifier to the servo controller based on the signal denoting the absolute position that is provided by the position detector to the servo amplifier and that corresponds to the number of rotations of the servomotor. At the step for outputting a command pulse signal for positioning in the reverse direction, the servo controller provides the command pulse signal to the servo amplifier. The command pulse signal is a position control pulse signal that decreases the number of stored pulses based on the number computed at the step for computing them.

When the servomotor is controlled and driven in a position-control mode, the step for crash stopping may comprise a step for computing the number of stored pulses and a step for outputting a command pulse signal for positioning in the reverse direction as in the second aspect of this invention.

Accordingly, the number of stored pulses can be computed at the step for doing so. The servo controller can provide to the servo amplifier the command pulse signal for positioning in the reverse direction and can crash stop the rod. The command pulse signal for positioning in the reverse direction is a position control pulse signal that decreases the number of stored pulses based on the number computed at the step for doing so.

By applying the method in which the command pulse signal for positioning in the reverse direction is provided to the servo amplifier, then even if a position-control mode is used, the effect of the number of stored pulses can be eliminated.

The third aspect of this invention relates to a method for controlling the electric cylinder of the second aspect of this invention. Namely, it is characterized in that the number of pulses of the command pulse signal for positioning in the reverse direction is greater than or equal to the number of stored pulses.

By the third aspect of this invention, the number of pulses of the command pulse signal for positioning in the reverse direction is greater than or equal to the number of stored pulses. Accordingly, the number of stored pulses can be rapidly decreased to 0 (zero). Also, when the number of pulses of the command pulse signal for positioning in the reverse direction is more than the number of stored pulses, the servomotor will reversely rotate, and thus the load for pressurizing the material to be pressed can be rapidly decreased. Therefore, the rod can efficiently avoid being overloaded.

The fourth aspect of this invention relates to a method for controlling the electric cylinder of the second or third aspect of this invention. Namely, it is characterized in that the frequency of the command pulse signals for positioning in the reverse direction is greater than or equal to the frequency of the pulses of the command for positioning.

By the fourth aspect of this invention, the frequency of the command pulse signals for positioning in the reverse direction is greater than or equal to the frequency of the pulses of the command for positioning. Therefore, the number of stored pulses can be rapidly decreased, to thereby stop the rod. Accordingly, the rod can efficiently avoid being overloaded.

The fifth aspect of this invention relates to a method for controlling the electric cylinder of the first aspect of this invention. Namely, it is characterized in that, when the movement of the servomotor is controlled in a position-control mode, the step for crash stopping comprises a step for stopping providing the command pulse signal for positioning by which the servo controller stops providing the command pulse signal for positioning to the servo amplifier, to thereby stop the rod.

By the fifth aspect of this invention, when the movement of the servomotor is controlled in a position-control mode, then at the step for crash stopping, and by the step for stopping providing the command pulse signal, the servo controller can stop providing the command pulse signal for positioning to the servo amplifier, to thereby immediately stop the rod.

The sixth aspect of this invention relates to a method for controlling the electric cylinder of the first aspect of this invention. Namely, it is characterized in that, when the movement of the servomotor is controlled in a speed-control mode, the step for crash stopping comprises a step for stopping providing the speed command signal by which the servo controller stops providing the speed command signal to the servo amplifier.

By the sixth aspect of this invention, when the movement of the servomotor is controlled in a speed-control mode, then at the step for crash stopping, and by the step for stopping providing the speed command signal, the servo controller can stop providing the speed command signal to the servo amplifier, to thereby immediately stop the rod.

Also, since in the speed-control mode the response to a command signal is faster than that in the position-control mode, a fast control can be done. Therefore, the rod can be immediately stopped and efficiently avoid being overloaded.

The seventh aspect of this invention relates to a method for controlling the electric cylinder of the first aspect of this invention. Namely, it is characterized in that, when the movement of the servomotor is controlled in a speed-control mode, the step for crash stopping comprises a step for providing from the servo controller to the servo amplifier a reverse signal that reverses the speed command signal and drives the rod in the reverse direction to that for pressurizing.

By the seventh aspect of this invention, when the movement of the servomotor is controlled in a speed-control mode, then at the step for crash stopping, and by the step for providing a reverse signal, the servo controller can provide to the servo amplifier the reverse signal that reverses the speed command signal and drives the rod in the reverse direction to that for pressurizing. Thus, the controller can drive the rod in the reverse direction and can crash stop it by this reverse movement. Since the rod is crash stopped by the reverse movement, it can avoid being overloaded.

Also, since in the speed-control mode the response to a command signal is faster than that in the position-control mode, a fast control can be done. Therefore, the rod can be immediately stopped and efficiently avoid being overloaded.

The eighth aspect of this invention relates to a method for controlling the electric cylinder of the first aspect of this invention. Namely, it is characterized in that, when the movement of the servomotor is controlled in a torque-control mode, the step for crash stopping comprises a step for stopping providing the torque command signal by which the servo controller stops providing the torque command signal to the servo amplifier.

By the eighth aspect of this invention, when the movement of the servomotor is controlled in a torque-control mode, then at the step for crash stopping, and by the step for stopping providing the torque command signal, the servo controller can stop providing the torque command signal to the servo amplifier, to thereby immediately stop the rod.

Also, since in the torque-control mode the response to a command signal is faster than that in the position-control mode or that in the speed-control mode, a fast control can be done. Therefore, the rod can be immediately stopped and efficiently avoid being overloaded.

The ninth aspect of this invention relates to a method for controlling the electric cylinder of the first aspect of this invention. Namely, it is characterized in that, when the movement of the servomotor is controlled in a torque-control mode, the step for crash stopping comprises a step for providing from the servo controller to the servo amplifier a reverse signal that reverses the torque command signal and drives the rod in the reverse direction to that for pressurizing.

By the ninth aspect of this invention, when the movement of the servomotor is controlled in a torque-control mode, then at the step for crash stopping, and by the step for providing a reverse signal, the servo controller can provide to the servo amplifier the reverse signal that reverses the torque command signal and drives the rod in the reverse direction to that for pressurizing. Thus, the controller can drive the rod in the reverse direction and can crash stop it by this reverse driving. Since the rod is crash stopped by the reverse driving, it can avoid being overloaded.

Also, since in the torque-control mode the response to a command signal is faster than that in the position-control mode or that in the speed-control mode, a fast control can be done. Therefore, the rod can be immediately stopped and efficiently avoid being overloaded.

The tenth aspect of this invention relates to a system for controlling an electric cylinder in a device. The device comprises an electric cylinder that moves a rod, a load detector attached to the rod that detects the load for pressurizing applied to a material to be pressed, a servomotor that drives the electric cylinder, and a position detector attached to the servomotor that is electrically connected to a servo amplifier. The servo amplifier is electrically connected to the servomotor and to a servo controller and controls the driving of the servomotor. The servo controller is electrically connected to the load detector and the servo amplifier and outputs a position control command to the servo amplifier so as to control the position of the servomotor.

The servo controller is configured to be able to set a speed of the rod, a load for detecting a bump between the rod and the material to be pressed, a flag for stopping when a bump occurs, and an allowable speed to bump. The flag for stopping is set for determining whether the driving of the rod should be allowed if the bump between the rod and the material is detected. The allowable speed to bump is set for determining whether the speed of the rod is the value at which the rod should be crash stopped. The servo controller drives the rod based on the speed of driving. Also, the controller determines whether the load for pressurizing detected by the load detector is larger than or equal to the load for detecting a bump. If it is determined that the load for pressurizing is larger than or equal to the load for detecting a bump, the servo controller determines whether the flag for stopping is ON. Also, the controller determines whether the speed of the rod is greater than or equal to the allowable speed to bump. If it is determined that the flag for stopping is ON or if it is determined that the speed of the rod is greater than or equal to the allowable speed to bump, the rod is crash stopped by braking the rod or driving the rod in the reverse direction.

By the tenth aspect of this invention, after the bump between the rod and the material to be pressed is detected, if the speed of the rod when it bumps is greater than or equal to the allowable speed to bump, the servo controller can crash stop the rod by braking the rod or driving the rod in the reverse direction. Therefore, the electric cylinder or the load detector attached to the rod can avoid being broken by being overloaded.

By the flag for stopping when a bump occurs, in a process in which a bump between the rod and the material to be pressed is not assumed, e.g., a process for moving the rod or a process for a jog, if a load to the rod is larger than or equal to the load for detecting the bump, the process is obviously determined to be in an abnormal state. In such a process, the rod can immediately be crash stopped to avoid being overloaded.

This system does not use a method in which an abnormality is determined when a load goes over a predetermined allowable load for pressurizing at a predetermined location of a rod, wherein the allowable load has been preliminarily set and memorized for that location. Therefore, this system can be applied to a press work for a material to be pressed in which a height of an axis for pressurizing differs from that for another material.

The eleventh aspect of this invention relates to a system for controlling an electric cylinder of the 10th aspect of this invention. Namely, it is characterized in that, when the movement of the servomotor is controlled in a position-control mode, the crash stop is carried out by computing the number of stored pulses, outputting a command pulse signal for positioning in the reverse direction, and causing the number of stored pulses in the servo amplifier to decrease, to thereby immediately stop the rod. For computing the number of stored pulses, the servo controller computes the number of stored pulses by subtracting the number of pulses of a feedback pulse signal from the number of pulses of the command pulse signal for positioning. The command pulse signal for positioning is the signal when the servo controller detects a flag for stopping or detects an allowable speed to bump. The feedback pulse signal is provided by the servo amplifier to the servo controller based on the signal denoting the absolute position that is provided by the position detector to the servo amplifier and that corresponds to the number of rotations of the servomotor. For outputting a command pulse signal for positioning in the reverse direction, the servo controller provides the command pulse signal to the servo amplifier. The command pulse signal is a position control pulse signal that decreases the number of stored pulses based on the number of stored pulses.

When the movement of the servomotor is controlled in a position-control mode, then by the eleventh aspect of this invention the servo controller can compute the number of stored pulses when it detects a flag for stopping or detects an allowable speed to bump. Then the servo controller provides to the servo amplifier the command pulse signal for positioning in the reverse direction, which is a position control pulse signal that decreases the number of stored pulses based on the number of stored pulses, to thereby immediately stop the rod.

By applying the method in which the command pulse signal for positioning in the reverse direction is provided to the servo amplifier, then, even if a position-control mode is used, the effect of the number of stored pulses can be eliminated.

The twelfth aspect of this invention relates to a system for controlling an electric cylinder of the eleventh aspect of this invention. Namely, it is characterized in that the number of pulses of the command pulse signal for positioning in the reverse direction is greater than or equal to the number of stored pulses.

By the twelfth aspect of this invention, the number of pulses of the command pulse signal for positioning in the reverse direction is greater than or equal to the number of stored pulses. Accordingly, the number of stored pulses can be rapidly decreased to 0 (zero). Also, when the number of pulses of the command pulse signal for positioning in the reverse direction is more than the number of stored pulses, the servomotor will reversely rotate, and thus the load for pressurizing the material to be pressed can be rapidly decreased. Therefore, the rod can efficiently avoid being overloaded.

The thirteenth aspect of this invention relates to a system for controlling the electric cylinder of the eleventh or twelfth aspect of this invention. Namely, it is characterized in that the frequency of the command pulse signal for positioning in the reverse direction is more than or equal to the frequency of the pulse of the command for positioning.

By the thirteenth aspect of this invention, the frequency of the command pulse signal for positioning in the reverse direction is more than or equal to the frequency of the pulse of the command for positioning. Therefore, the number of stored pulses can be rapidly decreased, to thereby stop the rod. Accordingly, the rod can efficiently avoid being overloaded.

The fourteenth aspect of this invention relates to a system for controlling the electric cylinder of the tenth aspect of this invention. Namely, it is characterized in that, when the movement of the servomotor is controlled in a position-control mode, the crash stop is carried out by the servo controller by stopping providing the command pulse signal for positioning to the servo amplifier, to thereby stop the rod.

By the fourteenth aspect of this invention, when the movement of the servomotor is controlled in a position-control mode, the servo controller can stop providing the command pulse signal for positioning to the servo amplifier, to thereby immediately stop the rod.

The fifteenth aspect of this invention relates to a system for controlling the electric cylinder of the tenth aspect of this invention. Namely, it is characterized in that, when the movement of the servomotor is controlled in a speed-control mode, the crash stop is carried out by the servo controller by stopping providing the speed command signal to the servo amplifier, to thereby stop the rod.

By the fifteenth aspect of this invention, when the movement of the servomotor is controlled in a speed-control mode, the crash stopping can be carried out by the servo controller by stopping providing the speed command signal to the servo amplifier, to thereby immediately stop the rod.

Also, since in the speed-control mode the response to a command signal is faster than that in the position-control mode, a fast control can be done. Therefore, the rod can be immediately stopped and efficiently avoid being overloaded.

The sixteenth aspect of this invention relates to a system for controlling the electric cylinder of the tenth aspect of this invention. Namely, it is characterized in that, when the movement of the servomotor is controlled in a speed-control mode, the crash stop is carried out by the servo controller by providing to the servo amplifier a reverse signal that reverses the speed command signal and drives the rod in the reverse direction to that for pressurizing.

By the sixteenth aspect of this invention, when the movement of the servomotor is controlled in a speed-control mode, the crash stop can be carried out by the servo controller by providing to the servo amplifier a reverse signal that reverses the speed command signal and drives the rod in the reverse direction to that for pressurizing. Thus, the controller can drive the rod in the reverse direction and can crash stop it by this reverse movement. Since the rod is crash stopped by the reverse movement, it can avoid being overloaded.

Also, since in the speed-control mode the response to a command signal is faster than that in the position-control mode, a fast control can be done. Therefore, the rod can be immediately stopped and efficiently avoid being overloaded.

The seventeenth aspect of this invention relates to a system for controlling the electric cylinder of the tenth aspect of this invention. Namely, it is characterized in that, when the movement of the servomotor is controlled in a torque-control mode, the crash stop is carried out by the servo controller by stopping providing the torque command signal to the servo amplifier, to thereby stop the rod.

By the seventeenth aspect of this invention, when the movement of the servomotor is controlled in a torque-control mode, the servo controller can carry out the crash stop by stopping providing the torque command signal to the servo amplifier, to thereby immediately stop the rod.

Also, since in the torque-control mode the response to a command signal is faster than that in the position-control mode or that in the speed-control mode, a fast control can be done. Therefore, the rod can be immediately stopped and efficiently avoid being overloaded.

The eighteenth aspect of this invention relates to a system for controlling the electric cylinder of the tenth aspect of this invention. Namely, it is characterized in that, when the movement of the servomotor is controlled in a torque-control mode, the crash stop is carried out by the servo controller by providing to the servo amplifier a reverse signal that reverses the torque command signal and drives the rod in the reverse direction to that for pressurizing.

By the eighteenth aspect of this invention, when the movement of the servomotor is controlled in a torque-control mode, the servo controller can provide to the servo amplifier the reverse signal that reverses the torque command signal and drives the rod in the reverse direction to that for pressurizing. Thus, the controller can drive the rod in the reverse direction and can crash stop it by this reverse movement. Since the rod is crash stopped by the reverse movement, it can avoid being overloaded.

Also, since in the torque-control mode the response to a command signal is faster than that in the position-control mode or that in the speed-control mode, a fast control can be done. Therefore, the rod can be immediately stopped and efficiently avoid being overloaded.

BEST MODE FOR CARRYING OUT THE INVENTION

Figure 1:
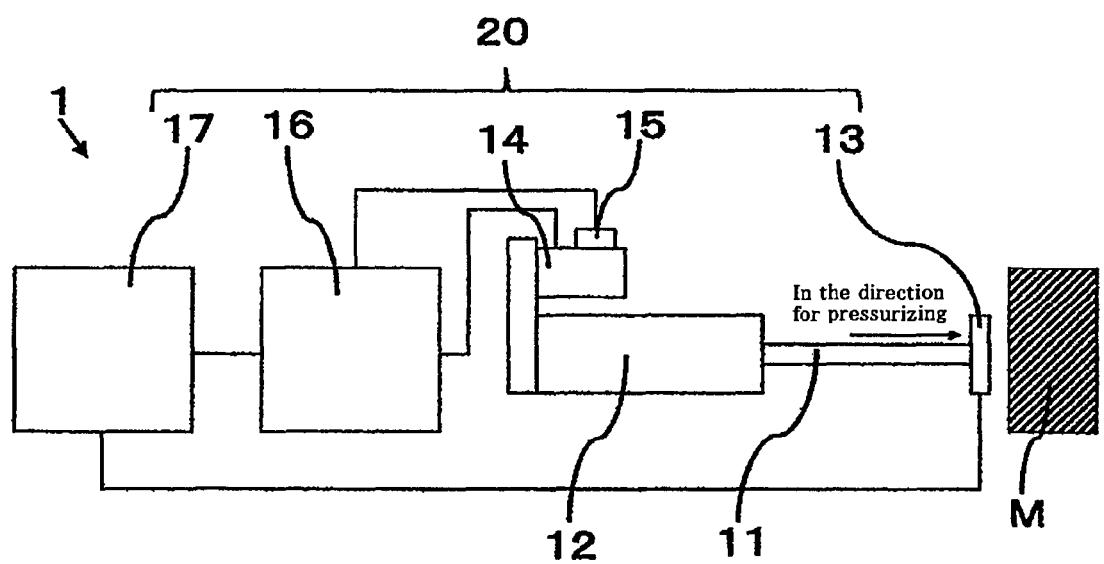
FIG. 1 is a schematic view of the device for press work that comprises the control system for the electric cylinder of this invention.

Now we discuss an embodiment of the system and the method for controlling the electric cylinder of this invention, i.e., by illustrating an example of a device for press work as an electric cylinder device, by referring to the drawings.

As in FIG. 1, the device for press work 1 comprises a rod 11, an electric cylinder 12, a load detector 13, a servomotor 14, a position detector 15, a servo amplifier 16, and a servo controller 17. The rod 11 pressurizes a material to be pressed M. The electric cylinder 12 moves the rod 11 in an axial direction. The load detector 13 is attached to the rod 11 and detects the load for pressurizing as it is applied to a material to be pressed M. The servomotor 14 drives the electric cylinder 12. The position detector 15 is typically such an encoder as that attached to the servomotor 14 and is electrically connected to a servo amplifier 16. The servo amplifier 16 is electrically connected to the servomotor 14 and the servo controller 17, and controls the drive of the servomotor 14. The servo controller 17 is electrically connected to the load detector 13 and the servo amplifier 16, and outputs a control command to the servo amplifier 16 so as to control the servomotor 14. The servo controller 17 is a so called positioning unit.

The control command from the servo controller 17 differs in the control mode for driving the servomotor 14. In the position-control mode, the position-control command is provided to the servo amplifier 16. In the speed-control mode, the speed-control command is provided. In the torque-control mode the torque-control command is provided to the servo amplifier 16. The position-control mode can preferably be applied to fabricate a material to be pressed. In the speed-control mode, since the response speed is faster than that in the position-control mode, a fast control can be done. In the torque-control mode, since the response speed is faster than the speed-control mode, the fastest control can be done, and so it can preferably be applied to a process for a press-fitting, etc.

A control unit 20, which works as a control system for an electric cylinder, comprises the load detector 13, the servomotor 14, the position detector 15, the servo amplifier 16, and the servo controller 17.

First Embodiment

In this embodiment, the servomotor 14 is driven in the position-control mode. The servo amplifier 16 and the servo controller 17 is composed so that they can control driving the servomotor 14 at least in the position-control mode. The control mode may be chosen from the speed-control mode and the torque-control mode.

Figure 2:
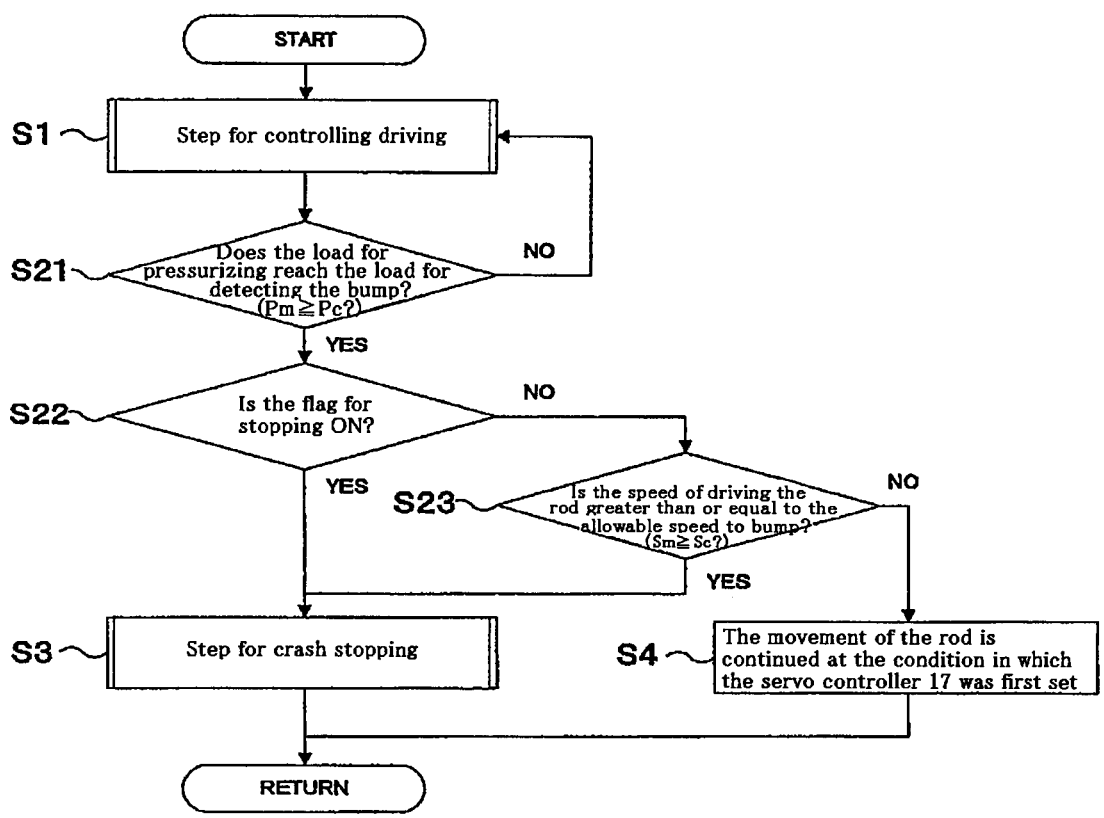
FIG. 2 is a flowchart that shows the method for controlling the electric cylinder of this invention.

Now we discuss a method for controlling an electric cylinder of this invention by referring to FIG. 2. First, the position-control mode is chosen as a control mode in the servo controller 17. Then a speed of driving a rod Sm, a load for detecting a bump Pc, a flag for stopping at the time of the bump, and an allowable speed to bump Sc, are input into the servo controller 17 via an input device, which is not shown. The load for detecting a bump Pc is used for detecting the bump between the rod 11 and a material to be pressed M. The flag for stopping at the time of the bump is used for determining whether the rod 11 should be allowed to be driven when the bump between the rod 11 and a material to be pressed M is detected. The allowable speed to bump Sc is a speed of driving the rod by which the determination whether the rod 11 should be crash stopped is done.

After a material to be pressed M is set at a predetermined position, the operation is started. Step S1, i.e., a step for controlling a drive, is carried out. At step S1, the rod 11 is driven based on the speed of driving that is input into the servo controller 17. Then the signal for the load for pressurizing that corresponds to the load for pressurizing Pm detected by the load detector 13 is provided by the load detector 13 to the servo controller 17

Figure 3:
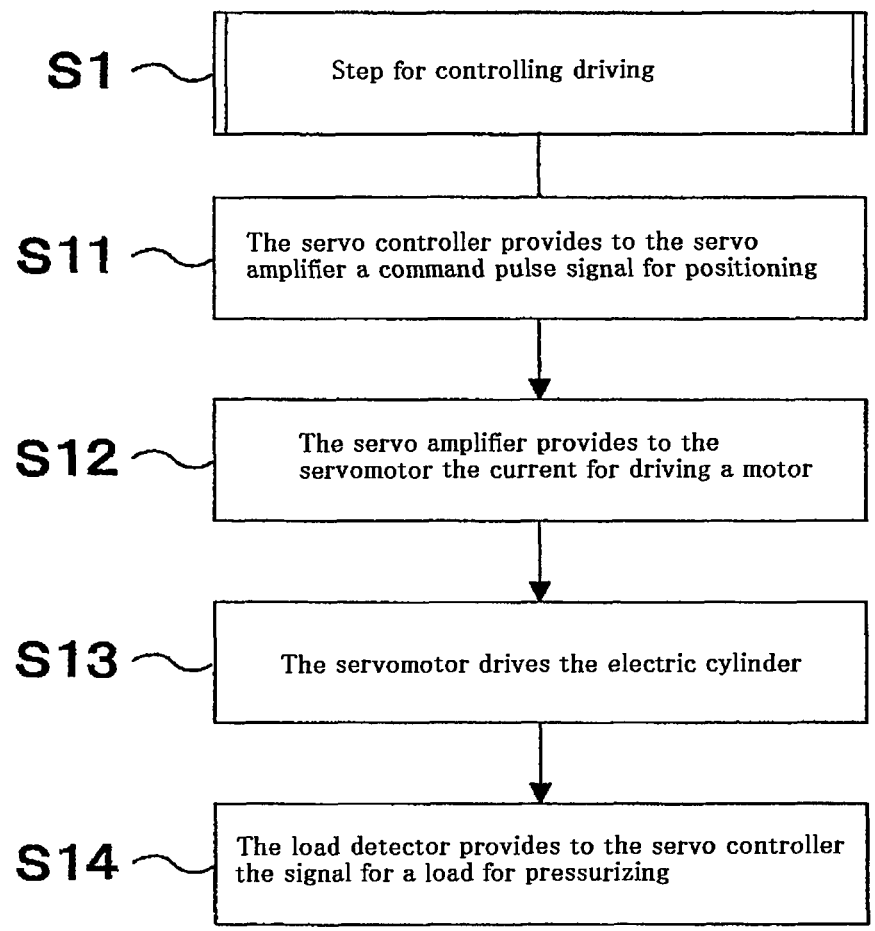
FIG. 3 is a flowchart that shows the method for controlling at the step for driving in the first embodiment of this invention.

As in FIG. 3, at step S11 the servo controller 17 provides a command pulse signal for positioning to the servo amplifier 16 based on the speed of the rod 11 which is input at step S1.

At the next step, S12, a deviation counter in the servo amplifier 16 counts the number of pulses in the command pulse signal for positioning based on the command pulse signal for positioning that is provided from the servo controller 17 at step S11. Then the servo amplifier 16 provides to the servomotor 14 the current for driving a motor that corresponds to the frequency of pulses and the number of pulses.

At the next step, S13, the servomotor 14 is driven at the current that is provided by the servo amplifier 16. The rotation of the servomotor 14 is converted into a linear motion by a ball screw mechanism that is built in the electric cylinder 12, so that the cylinder 12 can drive the rod 11. Thus the rod 11 goes forward to press the material to be pressed M. The load for pressurizing Pm is detected by the load detector 13.

As the servomotor 14 rotates, the position detector 15 that is attached to the servomotor 14 provides a signal to the servo amplifier 16 that denotes an absolute position corresponding to the number of rotations of the servomotor 14. The servo amplifier 16 converts the information on the signal denoting an absolute position into a feedback pulse signal and provides it to the servo controller 17. Further, the servo amplifier 16 controls the rotation of the servomotor 14 corresponding to the difference between the number of pulses of the command pulse signal for positioning and the number of pulses of the feedback pulse signal, i.e., corresponding to the number of stored pulses. The number of pulses of the command pulse signal for positioning is proportional to the angle of rotation of the servomotor 14. Therefore, the speed of driving the servomotor 14 is controlled by the frequency of the pulses of the command pulse signal for positioning, and the migration length is determined by the number of pulses.

At the next step, S14, the signal for a load for pressurizing that corresponds to the load for pressurizing Pm detected by the load detector 13 is provided by the load detector 13 to the servo controller 17.

At the next step, S21, i.e., the step for determining the load for detecting a bump, the servo controller 17 determines whether the load for pressurizing Pm reaches the load for stopping Ps, i.e., whether the load for pressurizing Pm is larger than or equal to the load for stopping Ps. If Pm≥Ps (yes, at step S21), the method goes to step S22.

If Pm<Ps (no, at step S21), it goes back to step S1. The command signal that corresponds to each control mode continues to be provided by the servo controller 17 to the servo amplifier 16 so that the rod 11 advances at the predetermined speed of driving until the load for pressurizing Pm reaches the load for stopping Ps.

At the next step, S22, i.e., the step for determining the flag for stopping at the time of the bump, the servo controller 17 determines whether the flag for stopping at the time of the bump is ON, i.e., determines whether the driving of the rod 11 should be allowed after the bump between the rod and the material is detected. If the flag for stopping at the time of the bump is ON (yes, at step S22), the method goes to step S3, i.e., a step for the crash stop. If the flag is OFF (NO, at step S22), it goes to step S23.

In a process in which a bump between the rod and the material to be pressed is not assumed, e.g., a process for moving the rod or a process for a jog, if a load to the rod is larger than or equal to the load for detecting the bump, the process is obviously determined to be in an abnormal state. In such a process, by setting the flag for stopping to ON, if the load is determined to be larger than or equal to the load for detecting the bump, the rod will be able to be crash stopped and avoid being overloaded.

At step S23, i.e., the step for detecting an allowable speed to bump, the servo controller 17 determines whether the speed of the rod reaches the allowable speed to bump Sc, i.e., whether the speed Sm is greater than or equal to the allowable speed to bump Sc. If Sm≥Sc (yes, at step S23), the method goes to step S3.

If Sm<Sc (no, at step S23), it goes to step S4, and then the movement of the rod 11 is continued at the condition in which the servo controller 17 was first set.

Figure 4:
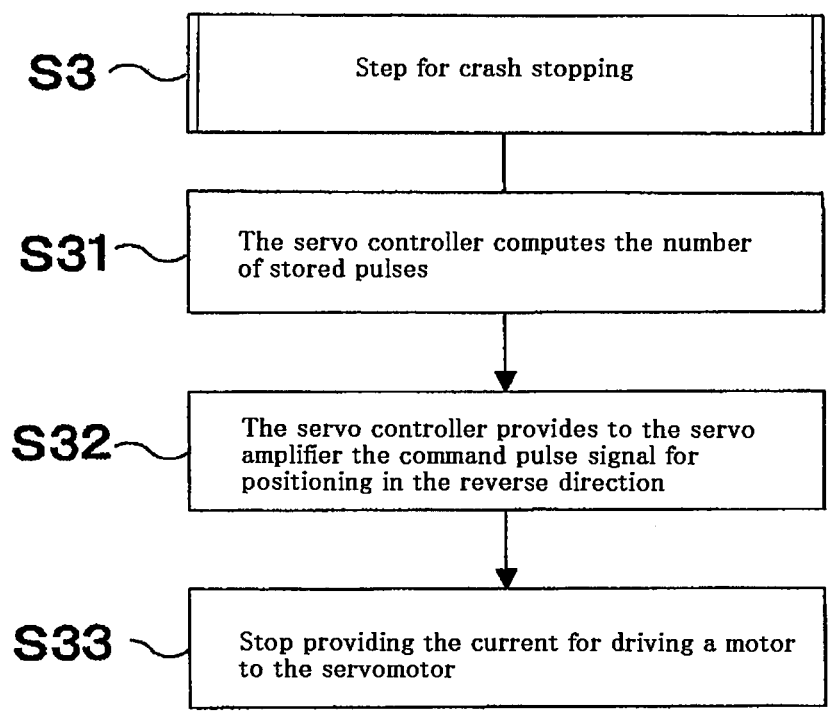
FIG. 4 is a flowchart that shows the method for controlling at the step for crash stopping in the first embodiment of this invention.

At step S3, i.e., the step for crash stopping, at step for computing the number of stored pulse S31, as in FIG. 4, the servo controller 17 computes the difference between the number of pulses of the command pulse signal for positioning and the number of pulses of the feedback pulse signal, i.e., the number of stored pulses. At this step, the command pulse signal for positioning and the feedback pulse signal are the signals denoting when the determination is done at the step for detecting a flag for stopping S22 or at the step for detecting an allowable speed to bump S23.

If the flag for stopping at the time of bump is ON (yes, at step S22), the computing the number of stored pulses can be carried out when the determination is done at the step for detecting a flag for stopping S22.

At the next step, S32, i.e., the step for providing the command pulse signal for positioning in the reverse direction, then based on the number of stored pulses that is computed at step S31 the servo controller 17 provides to the servo amplifier 16 the command pulse signal for positioning in the reverse direction. The command pulse signal is a position control pulse signal for reversely driving the rod 11. Namely, it is a position control pulse signal for reversely rotating the servomotor, and decreases the number of stored pulses.

The pulses for the command for positioning in the reverse direction are the pulses for a command in the reverse direction. The pulses can be configured as a train of reverse pulses that reverses the mark of the pulses of the stored pulses. The stored pulses are pulses for a positive direction.

At the next, step S33, the servo amplifier 16 decreases the number of stored pulses to stop providing the current for driving a motor to the servomotor 14, based on the command pulse signal for positioning in the reverse direction that is provided by the servo controller 17 at step S31.

Accordingly, at the step for the crash stop S3, the rod 11 can be crash stopped. Namely, at the step for computing the number of stored pulses S31, the number of stored pulses can be computed. At the step for providing the command pulse signal for positioning in the reverse direction S32, then based on the number of stored pulses that is computed at step S31 the servo controller 17 can provide to the servo amplifier 16 the command pulse signal for positioning in the reverse direction to crash stop the rod 11. The command pulse signal is a position control pulse signal for decreasing the number of stored pulses.

By applying the method in which the command pulse signal for positioning in the reverse direction is provided to the servo amplifier 16, even if a position-control mode is used the effect of the number of stored pulses can be eliminated.

Preferably, the load for detecting a bump Pc should be set to the value less than or equal to 10% of the nominal load and more than or equal to the setting ability, of the load detector 13. It is not preferable that the load for detecting a bump Pc be set to the value more than 10% of the nominal load of the load detector 13. Because if it is set to that value, the time at which the rod 11 should be crash stopped can be delayed, and can be overloaded.

The allowable speed to bump Sc can be set to any value at which the load detector 13 will not exceed the limit load that may damage the load detector 13 after a bump between the rod 11 and the material to be pressed M occurs. The value is set in consideration of the stiffness and the inertia, etc. of the mechanisms of the device for press work.

The number of pulses of the command pulse signal for positioning in the reverse direction can be set to any value in a certain range, as long as at that value the rod 11 can be stopped without causing the load for pressurizing Pm to be increased so as to reach the value at which the load detector 13 attached to the rod 11 is damaged. Preferably, to rapidly decrease the number of stored pulses to 0 (zero), the number of pulses of the command pulse signal for positioning in the reverse direction is set to the value more than the number of stored pulses. Especially, if the number of pulses of the command pulse is more than that of the stored pulses, the servomotor 14 will be reversely driven, and the load for pressurizing the material to be pressed M will be rapidly decreased. Thus the overload of the rod 11 can be effectively avoided.

Also, preferably, the frequency of the command pulse signals for positioning in the reverse direction is more than or equal to the frequency of the pulses of the command for positioning, so that the number of stored pulses rapidly decreases.

EXAMPLE 1

The effect of the first embodiment was verified by comparing it to the effect of a conventional method for controlling an electric cylinder, as a comparative example. However, this invention will not be restricted to the matter that is disclosed by the following example.

Figure 5:
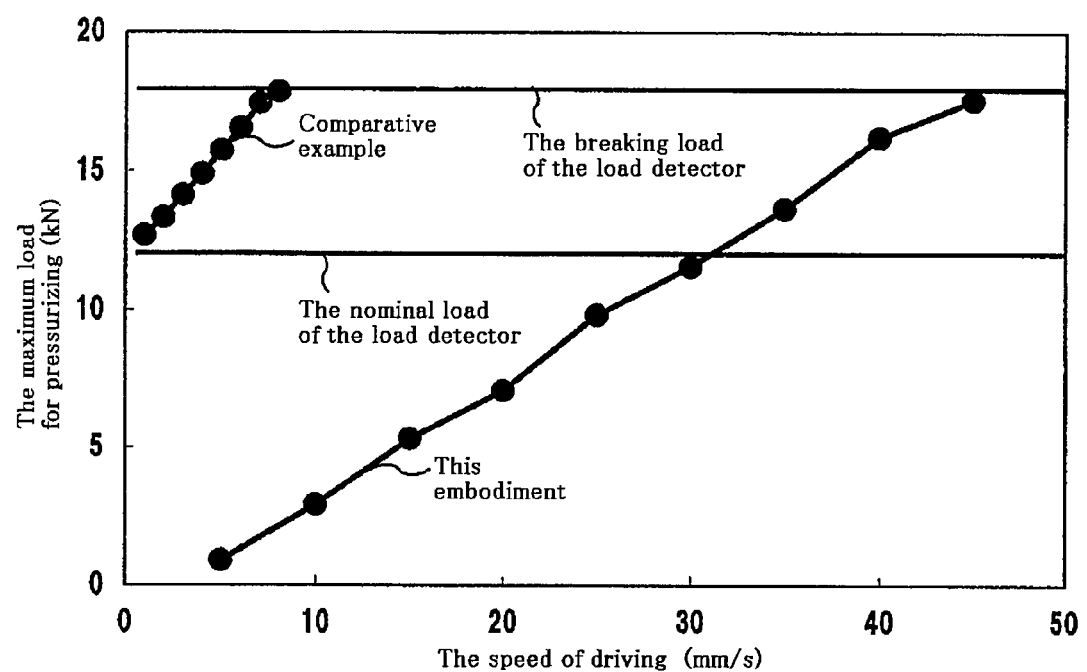
FIG. 5 is a graph that shows the relationship between the speed of driving and the maximum load for pressurizing, in two cases, for a comparison. One is when the first embodiment of the method for controlling the electric cylinder of this invention is used. The other is when a conventional method for controlling an electric cylinder is used.

FIG. 5 shows relationships between the speed of driving and the maximum load for pressurizing in two cases, for a comparison. One is when the method for controlling an electric cylinder of the first embodiment is used. The other is when a conventional method for controlling is used as a comparative example. The nominal load of the load detector (load cell) that is used for this embodiment is 12.0 kN and its breaking load is 18.0 kN.

The conditions for bumps in the method for controlling an electric cylinder of the first embodiment were as follows. The speed of driving when a rod bumped was increased from 5.0 mm/s to 45.0 mm/s by 5.0 mm/s. In each case, the load for detecting a bump Pc was 0.003 kN. The flag for stopping at the time of the bump was OFF. The allowable speed to bump Sc was 4 mm/s.

As a comparative example, a conventional method for controlling was used, in which when the load for pressurizing was more than the nominal load of a load detector, the load was determined to be overloaded, and a servo controller stopped providing a command pulse signal for positioning to a servo amplifier and stopped driving a rod. In the comparative example, the speed of driving when a rod bumped was increased from 1.0 mm/s to 8.0 mm/s by 1.0 mm/s.

As in FIG. 5, in the comparative example, when the speed of driving when the rod bumped was 8.0 mm/s, the load for pressurizing reached 17.861 kN, which was near the limit load of 18.0 kN that may damage the load detector (load cell), and the rod stopped.

In contrast, in the example of the first embodiment, even though the speed of driving when the rod bumped was 45.0 mm/s, which was thought to be a high speed, the load for pressurizing was aborted at 17.546 kN, and was not more than 18.0 kN, which was the limit load that may damage the load detector.

Accordingly, it was verified by the first embodiment of the method for controlling an electric cylinder that the overload can be more effectively avoided than by the comparative example. Also, it was verified that even though an unexpected bump occurred at a high rod speed of driving, the load detector that was attached to the rod avoided being damaged.

Effect of the First Embodiment (1) By the method for controlling an electric cylinder or the control system for the electric cylinder of this invention, after the bump between the rod 11 and the material to be pressed M is detected, if the speed of the rod 11 when it bumps is greater than or equal to the allowable speed to bump, the rod 11 can be crash stopped by braking the rod or driving the rod in the reverse direction. Therefore, the electric cylinder 12 and the load detector 13 attached to the rod can avoid being broken by being overloaded.

In a process in which a bump between the rod 11 and the material to be pressed M is not assumed, e.g., a process for moving the rod or a process for a jog, if a load to the rod is larger than or equal to the load for detecting the bump, the state of the process is obviously determined to be abnormal. In such a process, by setting the flag for stopping to ON, if the load is determined to be larger than or equal to the load for detecting the bump, the rod will be crash stopped and avoid being overloaded.

This invention does not use a method in which an abnormality is determined when a load goes over a predetermined allowable load for pressurizing at a predetermined location of a rod, wherein the allowable load has been preliminary set and memorized for that location. Therefore, this invention can be applied to a press work for a material to be pressed in which a height of an axis for pressurizing differs from that for another one.

(2) When the movement of the servomotor 14 is controlled in a position-control mode, the step for crash stopping comprises a step for computing the number of stored pulses and a step for outputting a command pulse signal for positioning in the reverse direction. At the step for the crash stop S3, the rod 11 can be crash stopped. Namely, at the step for computing the number of stored pulses S31, the number of stored pulses can be computed. At the step for providing the command pulse signal for positioning in the reverse direction S32, then based on the number of stored pulses that is computed at step S31 the servo controller 17 can provide to the servo amplifier 16 the command pulse signal for positioning in the reverse direction, to crash stop the rod 11. The command pulse signal is a position control pulse signal for decreasing the number of stored pulses.

By applying the method in which the command pulse signal for positioning in the reverse direction is provided to the servo amplifier 16, then even if a position-control mode is used the effect of the number of stored pulses can be eliminated.

The Second Embodiment

In this embodiment, the servomotor 14 is driven in the position-control mode. The step for the crash stop S3 in the second embodiment differs from that in the first embodiment.

At step S1, processes similar to those in the first embodiment are carried out. At the step for determining the load for detecting a bump S21, at the step for detecting a flag for stopping S22, and at the step for detecting an allowable speed to bump S23, if the condition for the crash stop, i.e., the condition for going to the step for the crash stop S3, is complied with, the step for the crash stop S3 is carried out.

Figure 6:
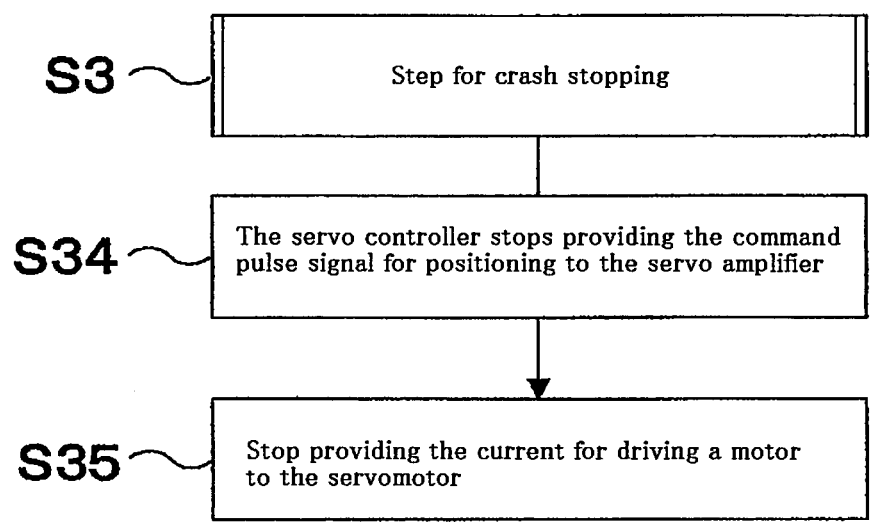
FIG. 6 is a flowchart that shows the step for crash stopping in the second embodiment of the method for controlling of this invention.

As in FIG. 6, at the step for the crash stop S3, by the step for stopping providing a command pulse signal for positioning S34, providing the command pulse signal for positioning that has been provided from the servo controller 17 to the servo amplifier 16 is immediately stopped.

At the next step, S35, the servo amplifier 16 stops providing to the servomotor 14 the current for driving a motor, based on the fact that providing the command pulse signal for positioning is stopped at the step for stopping providing a command pulse signal for positioning S34. Accordingly, the rod 11 is crash stopped, and effects similar to those by the first embodiment are gotten.

EXAMPLE 2

The effect of the second embodiment was verified. The load detector (load cell) and the comparative example that were used were similar to those in example 1 of the first embodiment.

The conditions for the bumps in the method for controlling the electric cylinder of the second embodiment were as follows. The speed of driving when a rod bumped was increased from 5.0 mm/s to 30.0 mm/s by 5.0 mm/s. In each case, the load for detecting a bump Pc was 0.050 kN. The flag for stopping at the time of the bump was OFF. The allowable speed to bump Sc was 4 mm/s.

Figure 7:
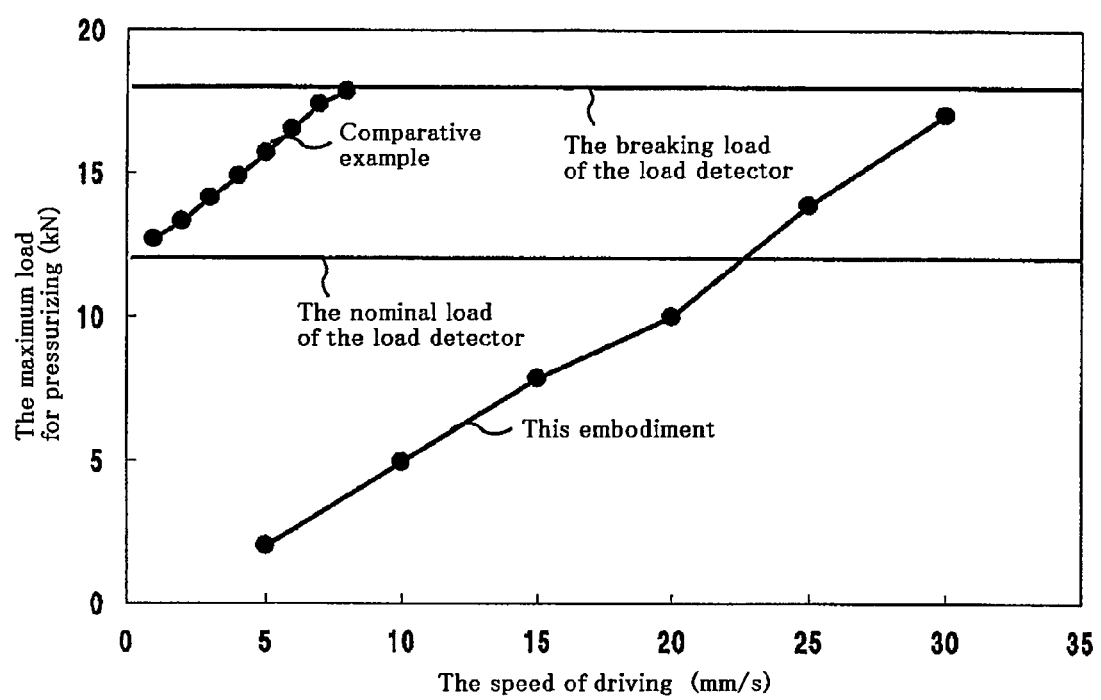
FIG. 7 is a graph that shows the relationship between the speed of driving and the maximum load for pressurizing, in two cases, for a comparison. One is when the second embodiment of the method for controlling the electric cylinder of this invention is used. The other is when a conventional method for controlling an electric cylinder is used.

As in FIG. 7, in the comparative example, when the speed of driving when the rod bumped was 8.0 mm/s, the load for pressurizing reached 17.861 kN, which was near the limit load, 18.0 kN, that may damage the load detector (load cell), and the rod stopped.

In contrast, in the example of the second embodiment, even though the speed of driving when the rod bumped was 30.0 mm/s, which was thought to be a high speed, the load for pressurizing was aborted at 16.861 kN, and was not more than 18.0 kN, which was the limit load that may damage the load detector.

Accordingly, it was verified by the second embodiment of the method for controlling an electric cylinder that the overload can be more effectively avoided than by the comparative example. Also, it was verified that even though an unexpected bump occurred at a high rod speed of driving, the load detector that was attached to the rod avoided being damaged.

Effect of the Second Embodiment

When the movement of the servomotor 14 is controlled in a position-control mode, then, at the step for determining the load for detecting a bump S21, and at the step for detecting a flag for stopping S22, and at the step for detecting an allowable speed to bump S23, if the condition for the crash stop is complied with, i.e., if the method goes to the step for the crash stop S3 through these steps, the rod 11 will be crash stopped. The crash stop S3 is carried out by the step for stopping providing a command pulse signal for positioning S34 by stopping providing the command pulse signal for positioning that has been provided from the servo controller 17 to the servo amplifier 16. Thus the rod 11 is crash stopped, and effects similar to the effect (1) of the first embodiment are gotten.

Also, even if a position-control mode is used, the effect of the number of stored pulses can be eliminated.

The Third Embodiment

In this embodiment, the servo amplifier 16 and the servo controller 17 are comprised so that they can control driving the servomotor 14 at least in the speed-control mode. The driving of the servomotor 14 is controlled in the speed-control mode.

Now we discuss an embodiment of the method for controlling the electric cylinder of this invention by referring to the drawings. First, the speed-control mode is chosen as a control mode in the servo controller 17. Then a speed of driving a rod Sm, a load for detecting a bump Pc, a flag for stopping at the time of a bump, and an allowable speed to bump Sc, are input into the servo controller 17 via an input device, which is not shown. The load for detecting a bump Pc is used for detecting the bump between the rod 11 and a material to be pressed M. The flag for stopping at the time of the bump is used for determining whether the rod 11 should be allowed to be driven when the bump between the rod 11 and a material to be pressed M is detected. The allowable speed to bump Sc is a speed of driving the rod by which the determination whether the rod 11 should be crash stopped is done.

After a material to be pressed M is set at a predetermined position, the operation is started. Then step S1, i.e., a step for controlling a drive, is carried out. At step S1, the rod 11 is driven based on the speed of driving that is input into the servo controller 17. Then the signal for the load for pressurizing that corresponds to the load for pressurizing Pm detected by the load detector 13 is provided by the load detector 13 to the servo controller 17.

Figure 8:
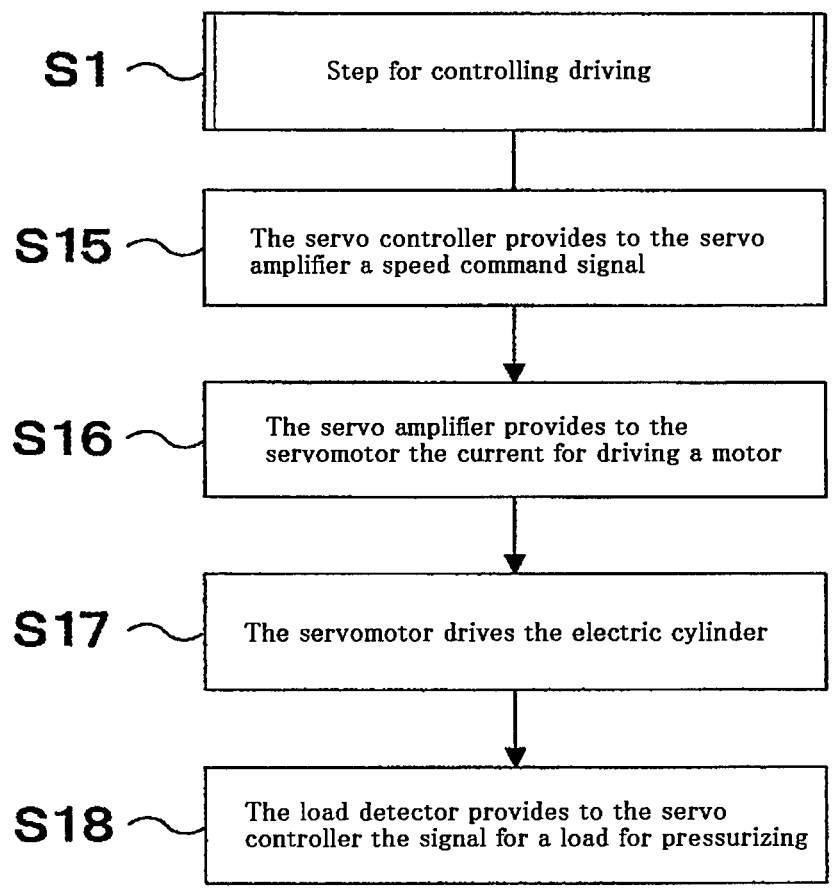
FIG. 8 is a flowchart that shows the method for controlling at the step for driving in the third embodiment of this invention.

As in FIG. 8, at step S15, the servo controller 17 provides a speed command signal to the servo amplifier 16 based on the speed of the rod 11 which is input at step S1.

At the next step, S16, the servo amplifier 16 provides to the servomotor 14 the current for driving a motor based on the speed command signal that is provided by the servo controller 17 at step S1.

At the next step, S17, the servomotor 14 is driven at the current that is provided by the servo amplifier 16. The rotation of the servomotor 14 is converted into a linear motion by a ball-screw mechanism that is built in the electric cylinder 12, so that the cylinder 12 can drive the rod 11. Thus the rod 11 goes forward to press the material to be pressed M. The load for pressurizing Pm is detected by the load detector 13.

At the next step, S18, the signal for a load for pressurizing that corresponds to the load for pressurizing Pm detected by the load detector 13 is provided by the load detector 13 to the servo controller 17.

The conditions in that the step for the crash stop S3 is carried out at the step for determining the load for detecting a bump S21, at the step for detecting a flag for stopping S22, and at the step for detecting an allowable speed to bump S23, are similar to those in the position-control mode.

Figure 9:
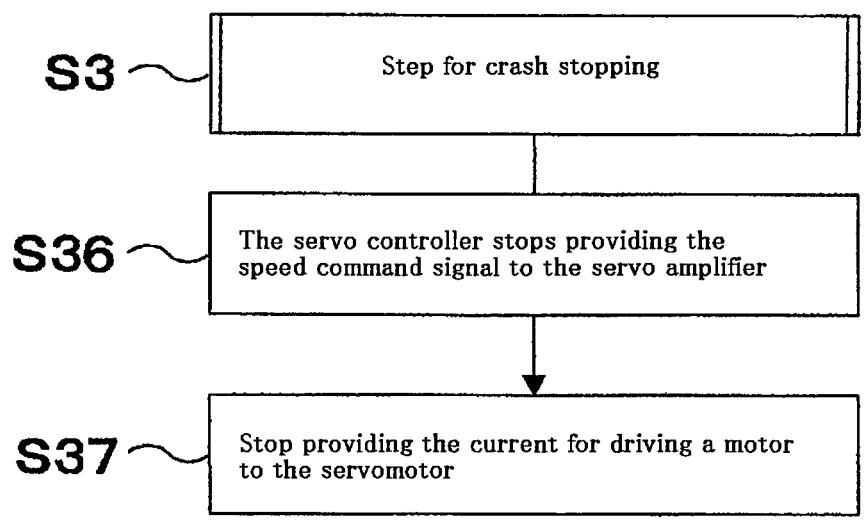
FIG. 9 is a flowchart that shows the method for controlling at the step for crash stopping in the third embodiment of this invention.

As in FIG. 9, at the step for crash stopping S3, by the step for stopping providing the speed command signal S36, the servo controller 17 stops providing the speed command signal (causes the speed command signal to be zero) to the servo amplifier 16.

At the next, step S37, the servo amplifier 16 stops providing to the servomotor 14 the current for driving a motor, based on the fact that providing the speed command signal from the servo controller 17 is stopped at the step for stopping providing a speed command signal S36.

Accordingly, the rod 11 is crash stopped, and effects similar to the effects (1) of the first embodiment are gotten.

In the speed-control mode, since the response speed to the command signal is faster than that in the position-control mode, a fast control can be done.

EXAMPLE 3

The effect of the third embodiment was verified. The load detector (load cell) and the comparative example that were used were similar to those in the example 1 of the first embodiment.

The conditions for the bumps in the method for controlling the electric cylinder of the third embodiment were as follows. The speed of driving when a rod bumped was increased from 5.0 mm/s to 50.0 mm/s by 5.0 mm/s. In each case, the load for detecting a bump Pc was 0.003 kN. The flag for stopping at the time of the bump was OFF. The allowable speed to bump Sc was 4 mm/s.

Figure 10:
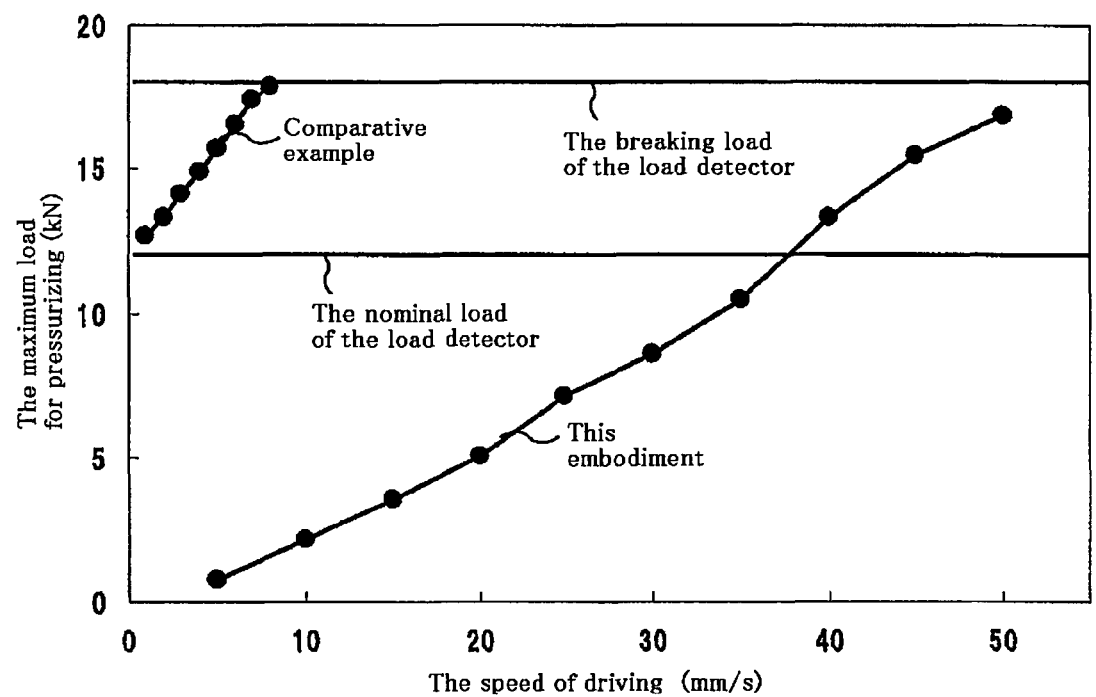
FIG. 10 is a graph that shows the relationship between the speed of driving and the maximum load for pressurizing, in two cases, for a comparison. One is when the third embodiment of the method for controlling the electric cylinder of this invention is used. The other is when a conventional method for controlling an electric cylinder is used.

As in FIG. 10, in the comparative example, when the speed of driving when the rod bumped was 8.0 mm/s, the load for pressurizing reached 17.861 kN, which was near the limit load, 18.0 kN, that may damage the load detector (load cell), and the rod stopped.

In contrast, in the example of the third embodiment, even though the speed of driving when the rod bumped was 50.0 mm/s, which was thought to be a high speed, the load for pressurizing was aborted at 16.861 kN, and was not more than 18.0 kN, which was the limit load that may damage the load detector.

Accordingly, it was verified by the third embodiment of the method for controlling an electric cylinder that the overload can be more effectively avoided than by the comparative example. Also, it was verified that even though an unexpected bump occurred on a rod at a high speed, the load detector that was attached to the rod avoided being damaged.

Effect of the Third Embodiment

When the movement of the servomotor 14 is controlled in a speed-control mode, then, at the step for determining the load for detecting a bump S21, and at the step for detecting a flag for stopping S22, and at the step for detecting an allowable speed to bump S23, if the condition for the crash stop is complied with, i.e., if the method goes to the step for the crash stop S3 through these steps, the rod 11 will be crash stopped. The crash stop is carried out by the step for stopping providing a speed command signal S36 by stopping providing the speed command signal that has been provided by the servo controller 17 to the servo amplifier 16. Thus the rod 11 is crash stopped and effects similar to the effects (1) of the first embodiment are gotten.

In the speed-control mode, since the response speed is faster than that in the position-control mode, a fast control can be done.

The Fourth Embodiment

In this embodiment, the servo amplifier 16 and the servo controller 17 are comprised so that they can control driving the servomotor 14 at least in the speed-control mode. The driving of the servomotor 14 is controlled in the speed-control mode. The step for the crash stop S3 in the fourth embodiment differs from that in the third embodiment.

At step S1, processes similar to those in the third embodiment are carried out. At the step for determining the load for detecting a bump S21, at the step for detecting a flag for stopping S22, and at the step for detecting an allowable speed to bump S23, if the condition for the crash stop, i.e., the condition for going to the step for the crash stop S3, is complied with, the step for the crash stop S3 is carried out.

Figure 11:
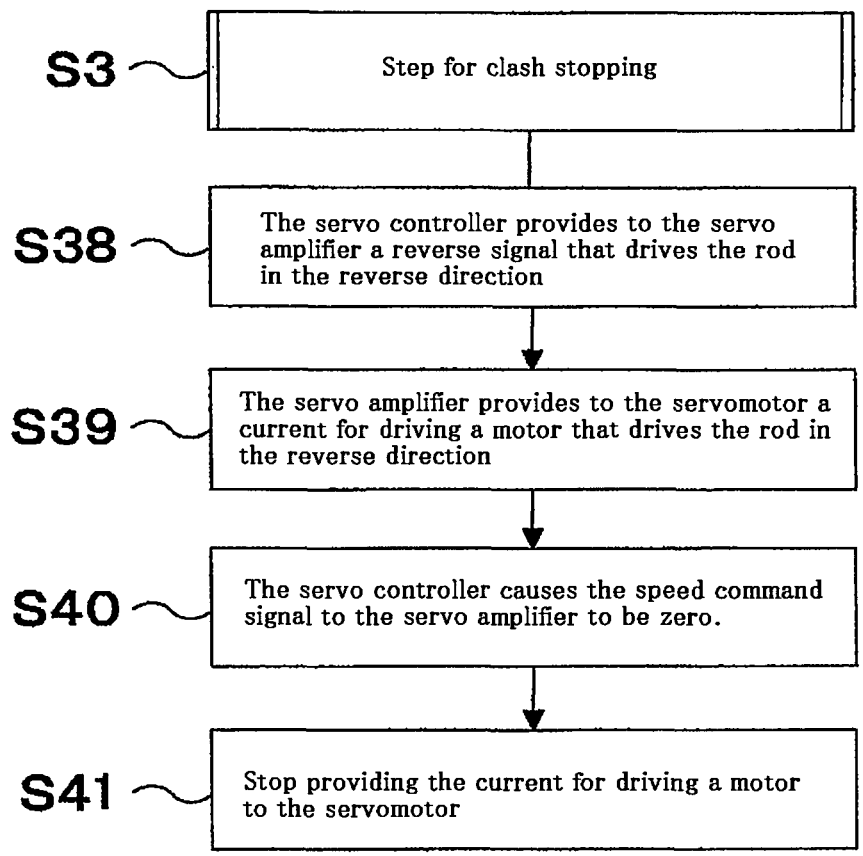
FIG. 11 is a flowchart that shows the method for controlling at the step for crash stopping in the fourth embodiment of this invention.

As in FIG. 11, at the step for the crash stop S3, by the step for providing a reverse signal S38, the reverse signal that reverses the speed command signal and drives the rod 11 in the reverse direction to that for pressurizing is provided from the servo controller 17 to the servo amplifier 16.

At the next step, S39, the servo amplifier 16 provides to the servomotor 14 a current for driving a motor that drives the rod 11 in the reverse direction to that for pressurizing, based on the reverse signal that has been sent by the servo controller 17 at the step for providing a reverse signal S38.

At the next step S40, the servo controller 17 stops providing the speed command signal (i.e., causes its output to be zero) to the servo amplifier 16. At step 41, the servo amplifier 16 stops providing the current for driving a motor to the servomotor 14.

Accordingly, the rod 11 is crash stopped by driving the rod in the reverse direction, and effects similar to the effects (1) of the first embodiment are gotten.

EXAMPLE 4

The effect of the fourth embodiment was verified. The load detector (load cell), the comparative example, and the conditions for the bumps that were used were similar to those in example 3 of the third embodiment.

Figure 12:
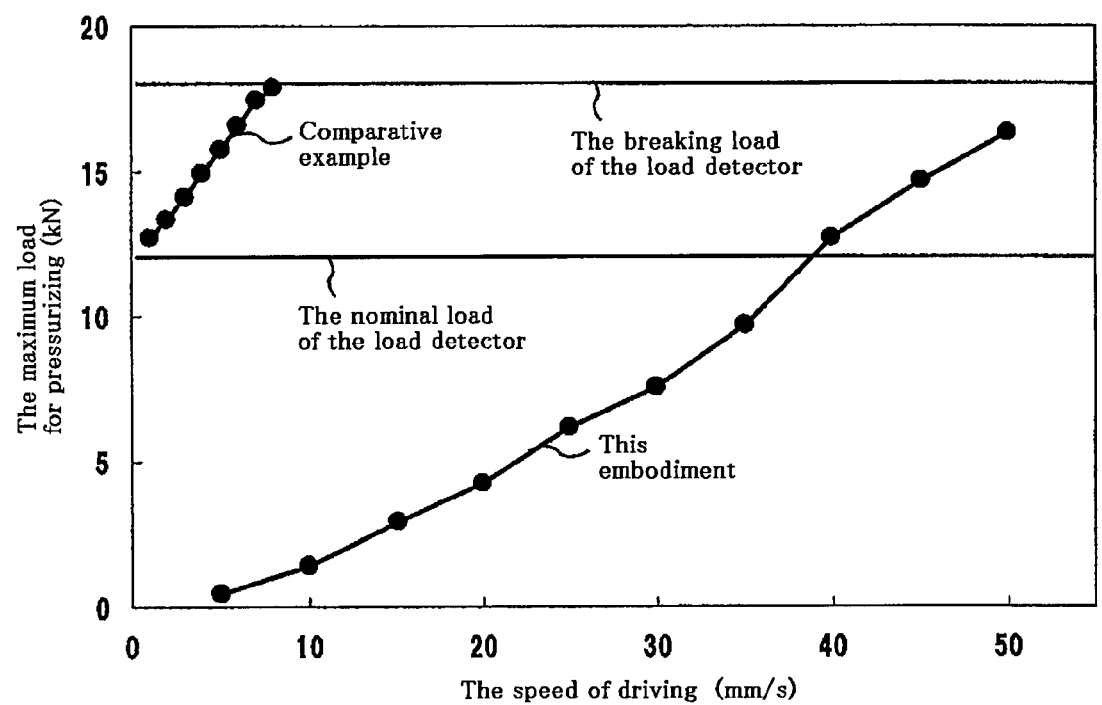
FIG. 12 is a graph that shows the relationship between the speed of driving and the maximum load for pressurizing, in two cases, for a comparison. One is when the fourth embodiment of the method for controlling the electric cylinder of this invention is used. The other is when a conventional method for controlling an electric cylinder is used.

As in FIG. 12, in the comparative example, when the speed of driving when the rod bumped was 8.0 mm/s, the load for pressurizing reached 17.861 kN, which was near the limit load, 18.0 kN, that may damage the load detector (load cell), and the rod stopped.

In contrast, in the example of the fourth embodiment, even though the speed of driving was 50.0 mm/s, which was thought to be a high speed, the load for pressurizing was aborted at 16.302 kN, and was not more than 18.0 kN, which was the limit load that may damage the load detector.

Accordingly, it was verified by the fourth embodiment of the method for controlling an electric cylinder that the overload can be more effectively avoided than by the comparative example. Also, it was verified that even though an unexpected bump occurred on a rod at a high speed, the load detector that was attached to the rod avoided being damaged.

Effect of the Fourth Embodiment

When the movement of the servomotor 14 is controlled in a speed-control mode, then, at the step for determining the load for detecting a bump S21, at the step for detecting a flag for stopping S22, and at the step for detecting an allowable speed to bump S23, if the condition for the crash stop is complied with, i.e., if the method goes to the step for the crash stop S3 through these steps, the rod 11 will be crash stopped. The crash stop S3 is carried out at the step for providing to the servo amplifier 16 a reverse signal S38 that reverses the speed command signal and that drives the rod 11 in the reverse direction to that for pressurizing from the servo controller 17. Thus the rod 11 is crash stopped, and effects similar to the effects (1) of the first embodiment are gotten.

Since the rod 11 is crash stopped by the reverse movement, the rod 11 can be immediately stopped and can avoid being overloaded.

In the speed-control mode, since the response speed to a command signal is faster than that in the position-control mode, a fast control can be done. Also, the rod 11 can be immediately stopped and can effectively avoid being overloaded.

The Fifth Embodiment

In this embodiment, the servo amplifier 16 and the servo controller 17 are comprised so that they can control driving the servomotor 14 at least in the torque-control mode. The driving of the servomotor 14 is controlled in the torque-control mode.

In the fifth embodiment, the speed command signal that is used for control in the third embodiment is replaced by the torque command signal in the torque-control mode. This is since the response speed to a command signal is faster than that in the position-control mode or that in the speed-control mode, a fast control can be done.

EXAMPLE 5

The effect of the fifth embodiment was verified. The load detector (load cell), the comparative example, and the conditions for the bumps that were used were similar to those in example 1 of the first embodiment.

Figure 13:
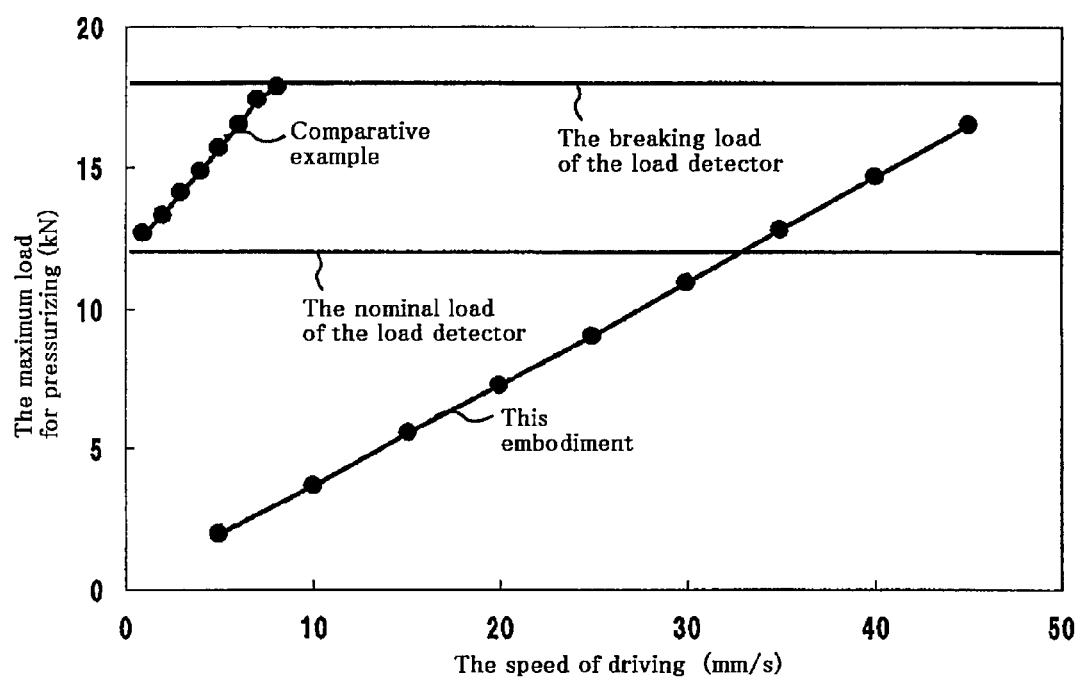
FIG. 13 is a graph that shows the relationship between the speed of driving and the maximum load for pressurizing, in two cases, for a comparison. One is when the fifth embodiment of the method for controlling the electric cylinder of this invention is used. The other is when a conventional method for controlling an electric cylinder is used.

As in FIG. 13, in the comparative example, when the speed of driving when the rod bumped was 8.0 mm/s, the load for pressurizing reached 17.861 kN, which was near the limit load, 18.0 kN, that may damage the load detector (load cell), and the rod stopped.

In contrast, in the example of the fifth embodiment, even though the speed of driving was 45.0 mm/s, which was thought to be a high speed, the load for pressurizing was aborted at 16.508 kN, and was not more than 18.0 kN, which was the limit load that may damage the load detector.

Accordingly, it was verified by the fifth embodiment of the method for controlling an electric cylinder that the overload can be more effectively avoided than by the comparative example. Also, it was verified that even though an unexpected bump occurred on a rod at a high speed, the load detector that was attached to the rod avoided being damaged.

Effect of the Fifth Embodiment

When the movement of the servomotor 14 is controlled in a torque-control mode, then, at the step for determining the load for detecting a bump S21, and at the step for detecting a flag for stopping S22, and at the step for detecting an allowable speed to bump S23, if the condition for the crash stop is complied with, i.e., if the method goes to the step for the crash stop S3 through these steps, the rod 11 will be crash stopped. The crash stop S3 is carried out by stopping providing the torque command signal that has been provided by the servo controller 17 to the servo amplifier 16. Thus the rod 11 is crash stopped, and similar effects to the effects (1) of the first embodiment are gotten.

In the torque-control mode, since the response speed to the command signal is faster than that in the position-control mode or that in the speed-control mode, a fast control can be done. Also, the rod 11 can be immediately stopped, and so can effectively avoid being overloaded.

The Sixth Embodiment

In this embodiment, the servo amplifier 16 and the servo controller 17 are comprised so that they can control driving the servomotor 14 at least in the torque-control mode. The driving of the servomotor 14 is controlled in the torque-control mode.

In the sixth embodiment, the speed command signal that is used for control in the fourth embodiment is replaced by the torque command signal in the torque-control mode. Since the response speed to a command signal is faster than that in the position-control mode or that in the speed-control mode, a fast control can be done.

EXAMPLE 6

The effect of the sixth embodiment was verified. The load detector (load cell) and the comparative example that were used were similar to those in example 1 of the first embodiment.

The conditions for the bumps in the method for controlling an electric cylinder of the six embodiment were as follows. The speed of driving when a rod bumped was increased from 5.0 mm/s to 60.0 mm/s by 5.0 mm/s. In each case, the load for detecting a bump Pc was 0.003 kN. The flag for stopping at the time of the bump was OFF. The allowable speed to bump Sc was 4 mm/s.

Figure 14:
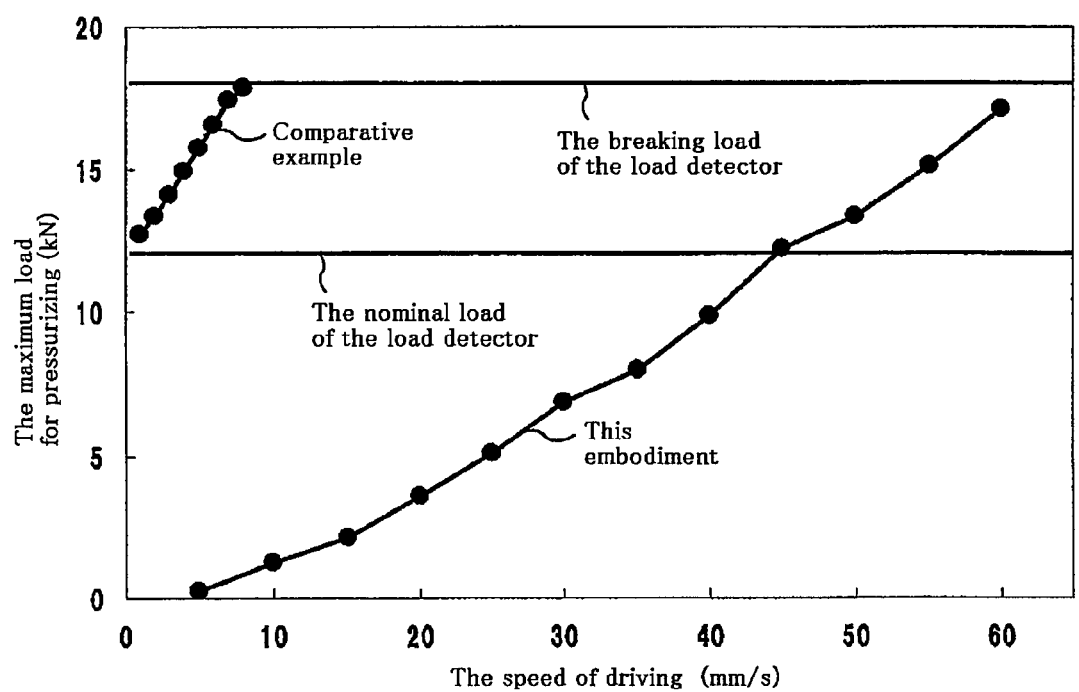
FIG. 14 is a graph that shows the relationship between the speed of driving and the maximum load for pressurizing, in two cases, for a comparison. One is when the sixth embodiment of the method for controlling the electric cylinder of this invention is used. The other is when a conventional method for controlling an electric cylinder is used.

As in FIG. 14, in the comparative example, when the speed of driving when the rod bumped was 8.0 mm/s, the load for pressurizing reached 17.861 kN, which was near the limit load, 18.0 kN, that may damage the load detector (load cell), and the rod stopped.

In contrast, in the example of the sixth embodiment, even though the speed of driving was 60.0 mm/s, which was thought to be a high speed, the load for pressurizing was aborted at 17.076 kN, and was not more than 18.0 kN, which was the limit load that may damage the load detector.

Accordingly, it was verified by the sixth embodiment of the method for controlling an electric cylinder that the overload can be more effectively avoided than by the comparative example. Also, it was verified that even though an unexpected bump occurred on a rod at a high speed, the load detector that was attached to the rod avoided being damaged.

In this embodiment, since the torque-control mode, in which the fastest control can be carried out, was applied, the rod 11 was crash stopped by the reverse movement. Thus the most effective result in examples 1-6 was verified.

Effect of the sixth Embodiment

When the movement of the servomotor 14 is controlled in a torque-control mode, then at the step for determining the load for detecting a bump S21, and at the step for detecting a flag for stopping S22, and at the step for detecting an allowable speed to bump S23, if the condition for the crash stop is complied with, i.e., if the method goes to the step for the crash stop S3 through these steps, the rod 11 will be crash stopped. The crash stop S3 is carried out by providing to the servo amplifier 16 the signal that reverses the torque command signal and that drives the rod 11 in the reverse direction to that for pressurizing from the servo controller 17. Thus the rod 11 is crash stopped, and effects similar to the effects (1) of the first embodiment are gotten.

Since the rod 11 is crash stopped by the reverse movement, the rod 11 can be immediately stopped, and so can avoid being overloaded.

In the torque-control mode, since the response speed to the command signal is faster than that in the position-control mode or that in the speed-control mode, a fast control can be done. Also, the rod 11 can be immediately stopped and can effectively avoid being overloaded.

Another Example

In the above examples, we discuss when the method or the system for controlling the electric cylinder 12 is applied to a device for press work 1. However, this invention is not restricted to this application, i.e., besides a device for press work, it can be applied to any other device or process that uses an electric cylinder.

For example, if a conventional method is applied to a process for a press-fitting, if the position of the direction for the press-fitting is too high and an abnormality occurs in the material to be fitted such as a little damage at its end, the load detector attached to the rod can be broken by an overload. However, if this invention is applied to a process for a press-fitting, the detector can efficiently avoid being overloaded. Thus, it has an advantage in that the load detector that is attached to the rod can avoided being damaged.

Also, if this invention is applied to a process for conveying articles by the rod of the electric cylinder, then even if an article to convey is at an unexpected location and the rod unexpectedly bumps the article, the rod can efficiently avoid being overloaded. Thus, it has an advantage in that the load detector that is attached to the rod can avoid being damaged.

Further, in this invention, the direction for moving the rod 11 is not only for extruding, but it can also be for pulling. Accordingly, this invention can be applied to the process for pulling, as well as the process for pressurizing.

EXPLANATION OF THE DENOTATIONS 1 device for press work (electric cylinder device)
11 rod
12 electric cylinder
13 load detector
14 servomotor
15 position detector
16 servo amplifier
17 servo controller
20 control unit
M material to be pressed
Pm load for pressurizing
Pc load for detecting a bump
Sm speed of driving
Sc allowable speed to bump

What is claimed is:
1. A method for controlling an electric cylinder in a device, wherein
the device comprises
an electric cylinder that moves a rod,
a load detector attached to the rod that detects the load for pressurizing applied to a material to be pressed,
a servomotor that drives the electric cylinder, and
a position detector attached to the servomotor that is electrically connected to a servo amplifier, wherein
the servo amplifier is electrically connected to the servomotor and to a servo controller and controls the movement of the servomotor, and wherein
the servo controller is electrically connected to the load detector and the servo amplifier and outputs a control command to the servo amplifier so as to control the servomotor, wherein
the method comprises:
a step for controlling the movement of the rod, wherein in the servo controller a speed of the rod, a load for detecting a bump between the rod and the material to be pressed, a flag for stopping determining whether the driving of the rod should be allowed if the bump between the rod and the material is detected, and an allowable speed to bump for determining whether the speed of the rod is the value at which the rod should be crash stopped, are set, and wherein the servo controller drives the rod based on the speed of driving that has been input into the controller, and causes the load detector to provide to the servo controller a signal for the load for pressurizing corresponding to the load for pressurizing detected by the load detector, and wherein the following steps take place:

a step for detecting a bump, wherein the servo controller determines whether the load for pressurizing is larger than or equal to the load for detecting a bump between the rod and the material, based on the signal for the load for pressurizing, a step for detecting a flag for stopping when a bump occurs, wherein the servo controller determines whether the flag is ON, a step for detecting an allowable speed to bump, wherein if the flag is OFF at the step for detecting the flag the servo controller determines whether the speed of the rod is greater than or equal to an allowable speed to bump, and a step for crash stopping, wherein if it is determined that the load for pressurizing is larger than or equal to the load for detecting the bump at the step for detecting a bump and it is determined that the flag is ON at the step for detecting a flag for stopping, or if it is determined that the speed of the rod is greater than or equal to the allowable speed to bump at the step for detecting an allowable speed to bump, then the rod is crash stopped by braking the rod or driving the rod in the reverse direction.

2. The method for controlling the electric cylinder of claim 1, wherein when the movement of the servomotor is controlled in a position-control mode the step for crash stopping comprises the following:

a step for computing the number of stored pulses, wherein the servo controller computes the number of stored pulses by subtracting the number of pulses from a feedback pulse signal from the number of pulses of the command pulse signal for positioning, wherein the command pulse signal for positioning is the signal when the determination is done at the step for detecting a flag for stopping or at the step for detecting an allowable speed to bump, and wherein the feedback pulse signal is provided by the servo amplifier to the servo controller based on the signal denoting the absolute position that is provided by the position detector to the servo amplifier and that corresponds to the number of rotations of the servomotor, and a step for outputting a command pulse signal for positioning in the reverse direction, wherein the servo controller provides to the servo amplifier the command pulse signal that is a position control pulse signal that decreases the number of stored pulses based on the number computed at the step for computing them.

3. The method for controlling the electric cylinder of claim 2, wherein the number of pulses of the command pulse signal for positioning in the reverse direction is greater than or equal to the number of the stored pulses.

4. The method for controlling the electric cylinder of claim 2, wherein the frequency of the command pulse signals for positioning in the reverse direction is greater than or equal to the frequency of the pulses of the command for positioning.

5. The method for controlling the electric cylinder of claim 1, wherein when the movement of the servomotor is controlled in a position-control mode the step for crash stopping comprises a step for stopping providing the command pulse signal for positioning by which the servo controller stops providing the command pulse signal for positioning to the servo amplifier, to thereby stop the rod.

6. The method for controlling the electric cylinder of claim 1, wherein when the movement of the servomotor is controlled in a speed-control mode the step for crash stopping comprises a step for stopping providing the speed command signal by which the servo controller stops providing the speed command signal to the servo amplifier.

7. The method for controlling the electric cylinder of claim 1, wherein when the movement of the servomotor is controlled in a speed-control mode the step for crash stopping comprises a step for providing from the servo controller to the servo amplifier a reverse signal that reverses the speed command signal and drives the rod in the reverse direction to that for pressurizing.

8. The method for controlling the electric cylinder of claim 1, wherein when the movement of the servomotor is controlled in a torque-control mode the step for crash stopping comprises a step for stopping providing the torque command signal by which the servo controller stops providing the torque command signal to the servo amplifier.

9. The method for controlling the electric cylinder of claim 1, wherein when the movement of the servomotor is controlled in a torque-control mode the step for crash stopping comprises a step for providing from the servo controller to the servo amplifier a reverse signal that reverses the torque command signal and drives the rod in the reverse direction to that for pressurizing.

10. A system for controlling an electric cylinder in a device, wherein the device comprises the following:

an electric cylinder that moves a rod, a load detector attached to the rod that detects the load for pressurizing applied to a material to be pressed, a servomotor that drives the electric cylinder, and a position detector attached to the servomotor that is electrically connected to a servo amplifier, wherein the servo amplifier is electrically connected to the servomotor and to a servo controller and controls the movement of the servomotor, and wherein the servo controller is electrically connected to the load detector and the servo amplifier and outputs a control command to the servo amplifier so as to control the servomotor, wherein the servo controller is configured to be able to set a speed of the rod, a load for detecting a bump between the rod and the material to be pressed, a flag for stopping determining whether the driving of the rod should be allowed if the bump between the rod and the material is detected, and an allowable speed to bump for determining whether the speed of the rod is the value at which the rod should be crash stopped, and wherein the servo controller drives the rod based on the speed of driving, determines whether the load for pressurizing detected by the load detector is larger than or equal to the load for detecting a bump, and if it is determined that the load for pressurizing is larger than or equal to the load for detecting a bump then the servo controller determines whether the flag for stopping is ON and the servo controller also determines whether the speed of the rod is greater than or equal to an allowable speed to bump, and if it is determined that the flag for stopping is ON or if it is determined that the speed of the rod is greater than or equal to an allowable speed to bump, then the rod is crash stopped by braking the rod or driving the rod in the reverse direction.

11. The system for controlling the electric cylinder of claim 10, wherein when the movement of the servomotor is controlled in a position-control mode the crash stop is carried out by
computing the number of stored pulses, wherein the servo controller computes the number of stored pulses by subtracting the number of pulses of a feedback pulse signal from the number of pulses of the command pulse signal for positioning, wherein the command pulse signal for positioning is the signal denoting when the servo controller detects a flag for stopping or detects an allowable speed to bump, and the feedback pulse signal is provided by the servo amplifier to the servo controller based on the signal denoting the absolute position that is provided by the position detector to the servo amplifier and that corresponds to the number of rotations of the servomotor,
outputting a command pulse signal for positioning in the reverse direction, wherein the servo controller provides to the servo amplifier the command pulse signal that is a position control pulse signal that decreases the number of stored pulses based on the number of stored pulses, and
causing the number of stored pulses in the servo amplifier to decrease, to thereby immediately stop the rod.

12. The system for controlling the electric cylinder of claim 11, wherein the number of pulses of the command pulse signal for positioning in the reverse direction is greater than or equal to the number of stored pulses.

13. The system for controlling the electric cylinder of claim 11 or 12, wherein the frequency of the command pulse signals for positioning in the reverse direction is more than or equal to the frequency of the pulses of the command for positioning.

14. The system for controlling the electric cylinder of claim 10, wherein when the movement of the servomotor is controlled in a position-control mode the crash stop is carried out by the servo controller by stopping providing the command pulse signal for positioning to the servo amplifier, to thereby stop the rod.

15. The system for controlling the electric cylinder of claim 10, wherein when the movement of the servomotor is controlled in a speed-control mode the crash stop is carried out by the servo controller by stopping providing the speed command signal to the servo amplifier, to thereby stop the rod.

16. The system for controlling the electric cylinder of claim 10, wherein when the movement of the servomotor is controlled in a speed-control mode, the crash stop is carried out by the servo controller by providing to the servo amplifier a reverse signal that reverses the speed command signal and drives the rod in the reverse direction to that for pressurizing.

17. The system for controlling the electric cylinder of claim 10, wherein when the movement of the servomotor is controlled in a torque-control mode, the crash stop is carried out by the servo controller by stopping providing the torque command signal to the servo amplifier, to thereby stop the rod.

18. The system for controlling the electric cylinder of claim 10, wherein when the movement of the servomotor is controlled in a torque-control mode the crash stop is carried out by the servo controller by providing to the servo amplifier a reverse signal that reverses the torque command signal and drives the rod in the reverse direction to that for pressurizing.

* * * * *